United States Patent Office

3,223,642
Patented Dec. 14, 1965

3,223,642
FLUORINATED REACTION PRODUCT USEFUL
AS A FUNCTIONAL FLUID
Robert K. Smith, Springfield Township, Delaware County,
Pa., and John Andreas Kearney, Pennsauken, N.J., assignors to E. F. Houghton & Co., Philadelphia, Pa., a corporation of Pennsylvania
No Drawing. Filed June 14, 1960, Ser. No. 35,875
12 Claims. (Cl. 252—78)

This invention relates to fluorine-containing silicon compounds. More particularly, it provides a novel method of producing fluorine-containing silicon compounds, a novel fluid product produced by such method which is particularly adapted for use as a fire-resistant, high-temperature lubricant or as a fire-resistant, high-temperature, hydraulic fluid; methods of using said fluid product; and compositions comprising the said fluid product.

A hydraulic fluid is used to transfer power in applications utilizing fundamental hydraulic principles to give mechanical advantages. Fluid properties are a major consideration in hydraulic system design and establish the limits of the environment in which the hydraulic system will operate. There are few types of fluids which meet the requirements of practical hydraulic applications.

Viscosity-temperature characteristics directly affect the ability of a fluid to flow in a hydraulic system. A hydraulic fluid used over a wide temperature range must show a small change in the rate of flow with change of temperature, to reduce power loss due to fluid friction at low temperature and still retain proper sealing at elevated temperatures. A minimum viscosity of 2.5 centistrokes at maximum use temperature is considered desirable to minimize seal leakage. The present target temperature use range extends from —65° F. to at least 400° F. for military aircraft, and the higher the possible use temperature the better.

Additionally, hydraulic fluids should possess sufficient oxidation resistance to permit their use for a reasonable use period. They must not corrode or attack the metals of construction of the hydraulic system, or decompose even at the maximum use temperature. Absence of toxicity is required to the extent that direct contact, inhalation of vapor or effects of decomposition should not be injurious to personnel. Possession of a high bulk modulus is considered a desirable attribute. Numerous other properties are also considered in evaluating hydraulic fluids.

Aircraft use hydraulics extensively, in utility system operating wheele brakes, landing gears, wing flaps, dive brakes, and numerous other devices. In recent years hydraulic systems have also been used in flight control boost systems and in full power flight control applications.

Petroleum products are now used in aircraft as hydraulic fluids. These fluids are, however, dangerously inflammable. Hydraulic fluid fires have occurred in airplanes with sufficient frequency to cause considerable attention to be given to the problem of finding fire-resistant hydraulic fluids. Factors in present-day aircraft indicate trends towards increasing the hydraulic fluid fire hazard. For example, in the landing wheel area the fire hazard is increased by higher landing speeds; less space for brakes with consequent decrease of heat dissipation; and engine idle characteristics requiring constant braking during taxi. Moreover, aircraft ambient temperatures are already high and are expected to increase still further. Some electronic components and heated air ducts reach temperatures above the spontaneous ignition temperature of the petroleum base hydraulic fluids, which is 436° F. minimum at sea level.

An extensive program of fluid investigation has been conducted under the auspices of the U.S. Navy and Air Force since World War II, in the attempt to provide wide range hydraulic fluids with reduced flammability characteristics, without success. In 1955, the Air Force issued a specification (MIL–H–8446) for high temperature hydraulic fluids useful over the range of from —65° F. to 400° F., defining properties required. A concentrated program for the next five years failed to develop any fire-resistant products which qualified under this specification.

The problem of supplying lubricants suitable for extreme temperature ranges has become equally as complex as that relating to hydraulic fluids. While many high performance power plants such as rocket engines, ram-jets, and other engines currently under development do not require direct lubrication, high temperatures are generated in auxiliary power systems necessary for the proper functioning of the vehicle. Under such conditions, currently known lubricants cannot function properly. Present military fluid lubricants have a maximum operating temperature of 400° F. as exemplified by proprietary products satisfying the requirements of Specification MIL–L–9236 B. Above 400° F., these materials present problems of extremely high volatility as well as poor lubricity and flammability hazards.

Moreover, the use of high specific energy systems, such as those involving liquid oxygen, fuming red nitric acid or other powerful oxidizers, present additional operating and handling hazards. These hazards are of such magnitude that even ground or platform handling equipment which does not come in direct contact with the fuel supply systems must utilize fire-resistant fluids for the safety and efficient handling of missiles before firing. Lubricants currently in use in such craft cannot cope with the extremes of conditions necessary for the proper operation of the craft.

The problems imposed in systems such as those discussed above are not limited to fluid lubricants. Semisolid lubricants or greases are required for the proper functioning of valves, control mechanisms, exposed gear systems, antifriction bearings, screw actuators and spherical bearings. Progress in the development of such greases for operations at temperatures greater than 500° F. has been retarded primarily by the lack of suitable fluids. Gelling or thickening agents capable of operation at high temperatures have been successfully developed. Completely satisfactory greases have not been available up to the present.

A particular object of this invention is to provide a novel hydraulic fluid which is fire-resistant, operable over a wide temperature range, at least as low at —65° F. and extending to well above 400° F., and which has unusually good heat stability and minimal oxidation corrosion.

Another object is to provide a method of making a fluid of the stated characteristics.

Another object is to provide a novel fluid having properties adapting it for use as a functional fluid in applications requiring high thermal stability and fluidity over a wide temperature range.

Another object is to provide a novel fluid adapted for use as a wide temperature range lubricating base fluid.

Another object is to provide novel lubricating compositions wherein the lubricant base fluid is a novel fluid as provided by this invention.

Another object is to provide a novel method of transmitting hydraulic pressure.

Another object is to provide a novel method of lubricating.

These and other objects will become evident from the following specification and claims.

The presently provided novel method, broadly stated, comprises reacting a hydrolyzable silicon compound containing from 1 to 2 Si atoms with a fluorinated alcohol of the formula

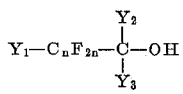

where $n$ is an integer of from 2 to 12 and $Y_1$, $Y_2$ and $Y_3$ are each selected separately from the group consisting of H and F, to form a reaction product comprising a silicate ester containing at least 12 fluorinated carbon atoms. As will appear hereinafter, in said silicate ester, each silicon atom is esterified by at least 3 ester radicals selected from the class consisting of saturated aliphatic hydrocarbon radicals and fluorine-substituted saturated aliphatic hydrocarbon radicals, and any residual silicon atom valence is connected to an oxygen-terminated silicon-to-silicon linking radical.

The stated silicate ester may be, for example, a dialkyl diperfluoroalkyl silicate, containing at least 12 fluorinated carbon atoms, formed by transesterification of a fluorinated alcohol containing at least 6 fluorinated carbon atoms with a tetraalkyl orthosilicate. Transesterification of an alkyl orthosilicate with an alcohol replaces alkyl radicals of the alkyl silicate with the radicals of the alcohol. An alkyl silicate constitutes the stated hydrolyzable silicon compound employed in the present method, in a preferred embodiment of this invention.

The reaction product produced by the stated method may and indeed, generally and preferably will be of complex composition. It may, for example, comprise each of the possible esters produced by transesterification of an alkyl silicate with a fluorinated alcohol. It may also comprise other compounds such as silicate condensates. Disiloxane structures may be developed from a tetra-substituted hydrolyzable silicon compound containing a single silicon atom by reaction with water, for example; and similiarly, higher polysiloxanes may be produced. In any case, it has now been found that the product of the stated method, including a complex reaction product produced by the stated method, is a valuable source of a novel product as herein provided.

The portion of the stated reaction product boiling at above about 600° F. at atmospheric pressure comprises the novel product of this invention. This invention includes a product consisting of all of the stated portion of the reaction product, or any part thereof. In a preferred embodiment of the present method, the present product is isolated by removing from the reaction product any portion thereof boiling below the temperature of 600° F. at atmospheric pressure, and recovering the residue.

The present novel product prepared as above stated is a fire-resistant, heat-stable functional fluid particularly adapted for use as a wide temperature range hydraulic fluid and lubricating base fluid.

The hydraulic fluid compositions provided by this invention comprise the said product as a base fluid. Additives which improve oxidation stability, anti-wear properties, viscosity-temperature characteristics or the like may be present in such compositions.

The said novel product forms the lubricating base of lubricating compositions as provided by this invention. Such lubricating compositions may additionally comprise additives as conventional in the lubricating art.

The method of hydraulic transmission of power provided by this invention consists in operating a hydraulic pumping power system wherein hydraulic pressure is transmitted by a hydraulic fluid comprising the novel product of this invention.

The method of lubricating provided by this invention consists in interposing a lubricating composition comprising the said novel product as a lubricating base fluid between surfaces in frictional contact.

Particular advantages of the novel method of the present invention are that it produces the presently provided novel product directly and simply, while having a high degree of flexibility. That a complex reaction product is produced by the stated method is also an advantage, for indications have been found that the resulting complex product may be more advantageously adapted for use in certain respects, particularly for use as a hydraulic fluid, than its individual components.

The novel fluid product of the present invention is particularly valuable because it possesses an unusual combination of properties especially adapting it for use as a functional fluid, particularly as a hydraulic fluid. Thus, such a product remains fluid, does not volatilize, and does not change excessively in viscosity over a very wide temperature range, extending from −65° F. to 600° F. or above, frequently to 650° F.; it has exceptional thermal stability; it is generally non-corrosive; it is an unusually good lubricant; it has the high bulk modulus which is desirable for a hydraulic fluid; and most importantly, because the present product is also fire-resistant.

The provision of a fluid having the stated properties and thus adapted for use as a hydraulic fluid in aircraft hydraulic systems while at the same time being fire-resistant is a particularly important development in view of the above-discussed fact that very intensive efforts made over an extended period of time hitherto have failed to develop any fluid meeting these specifications. The fact that such an intensive effort had been made is evidence of the need and demand for such novel products and also of the difficulty in attaining a product which would meet the specifications.

The novelty of the unusual combination of properties possessed by the presently provided product will be particularly evident when this fluid is compared to various other fluids which have been proposed or used in the prior art as hydraulic fluids. Thus, the fluids proposed for use as fire-resistant hydraulic fluids have included, on the one hand, fluorinated polymers. However, the fluorinated polymeric fluids of this type which have a viscosity at 100° F. comparable to that of the presently provided novel fluid at the same temperature have an undesirably high pour point. This excludes these fluorinated polymers from use in military aircraft, which requires a pour point of below −65° F. The pour point of the presently provided product may be as low as −100° F. On the other hand, certain siliceous materials have been proposed for use as hydraulic fluids. Of these, the thermally stable alkyl aryl silicone polymers also have a pour point substantially higher than that of the presently provided fluids. Thus, like the above-mentioned fluorinated polymers, they are not capable of meeting a specification requiring operability over a range extending down to −65° F. Moreover, such silicone polymers also have poor lubricity, and their lubricating properties are very much inferior to those of the presently provided product. The alkyl and substituted alkyl silicates proposed for use as hydraulic fluids heretofore even less well adapted to replace petroleum-base hydraulic fluids. Not only are they poor lubricants, but they are flammable.

It will accordingly be evident that the presently provided novel product is outstandingly and unexpectedly adapted for use, as a wide temperature range, fire-resistant hydraulic fluid.

Additionally, the unusually high load-carrying properties of the product of this invention makes it valuable for use as a lubricating base fluid for extreme pressure lubricants, particularly in high temperature environments.

As will be appreciated, the temperature properties of the present product also adapt it for use as a heat transfer agent—for example, as a coolant in computing machines. Moreover, this product has a high density, fitting it for use as a flotation medium in high temperature gyro compasses and the like.

Compositions embodying this novel product obviously share the stated advantages; and the procedures provided by this invention for transmitting hydraulic pressure and for lubricating are advantageous in that the wide temperature range of operability of the presently provided novel product gives them substantially greater scope and applicability than has been possible heretofore.

Referring now to the method of the present invention, this employs as one reactant a fluorinated alcohol of the formula

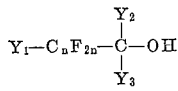

where $n$ is an integer of from 2 to 12 and $Y_1$, $Y_2$ and $Y_3$ are each selected separately from the group consisting of H and F. Either individual alcohols or mixtures of alcohols of the stated formula may be used in conducting the present method. The stated fluorinated alcohols include perfluoroalkanols such as perfluoroethyl alcohol, perfluoropropyl alcohol, perfluoroisopropyl alcohol, perfluorobutyl alcohol, perfluorohexyl alcohol, perfluorooctyl alcohol, perfluorodecyl alcohol, perfluorododecyl alcohol and perfluorotridecyl alcohol. The stated fluorinated alcohols also include fluoroalkyl-carbinols. One such group of fluoroalkyl-carbinols comprises 1,1-dihydroperfluoroalkanols. These can be prepared, for example, by hydrogenation of a perfluoroalkanoic acid. Exemplary thereof are 1,1-dihydroperfluoropropyl alcohol, 1,1-dihydroperfluorobutyl alcohol, 1,1-dihydroperfluoroisoamyl alcohol, 1,1-dihydroperfluoro-2-ethylhexyl alcohol, 1,1-dihydroperfluorodecyl alcohol, and so forth. Another such group of fluoroalkyl-carbinols comprises 1,1,omega-trihydroperfluoroalkanols. These may be prepared, for example, by telomerizing a perfluorinated olefin with methyl alcohol. Such fluorinated alcohols form the presently preferred type of fluorinated alcohol for use in the method of this invention. Illustrative thereof are, for example, 1,1,3-trihydroperfluoropropyl alcohol, 1,1,5-trihydroperfluoroamyl alcohol, 1,1,7-trihydroperfluoroheptyl alcohol, 1,1,9-trihydroperfluorononyl alcohol, 1,1,11-trihydroperfluoroundecyl alcohol, and 1,1,13-trihydroperfluorotridecyl alcohol.

A hydrolyzable silicon compound containing from 1 to 2 silicon atoms is reacted with the said fluorinated alcohol in accordance with the method of this invention. The said hydrolyzable silicon compound is most preferably an alkyl orthosilicate ester of the formula

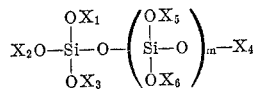

where $m$ is an integer of from 0 to 1 and each of $X_1$, $X_2$, $X_3$, $X_4$, $X_5$ and $X_6$ is a saturated aliphatic hydrocarbon radical. Preferably each of $X_1$, $X_2$, $X_3$, $X_4$, $X_5$ and $X_6$ is a lower alkyl radical containing from 1 to 8 carbon atoms.

Ethyl radicals are particularly preferred. However, depending on the fluorinated alcohol with which it is refracted in accordance with the method of the present invention, it will sometimes be desirable to employ alkyl silicates of the said formula in which one or more of the alkyl groups are of longer chain length, containing up to 13 carbon atoms. Exemplary of the alkyl silicates of the above formula when $m=0$ are the lower alkyl silicates such as tetraethyl silicate, tetramethyl silicate, tetrapropyl silicate, tetraisopropyl silicate, tetra-n-butyl silicate, tetraisobutyl silicate, tetraamyl silicate, tetraisohexyl silicate, tetra(1,3 - dimethylbutyl) silicate, tetra(2 - ethylhexyl) silicate, tetra(1 - methylhexyl) silicate, tetra(2,2,4 - trimethylpentyl) silicate, tetra(1 - methylcyclohexylcarbinyl) silicate, and silicates including higher alkyl radicals such as tetranonyl silicate, tetradecyl silicate, tetradodecyl silicate, and tetratridecyl silicate. Mixed alkyl silicates such as triethyl isopropyl silicate, triethyl butyl silicate, tributyl hexyl silicate, triethyl (2-ethylhexyl) silicate, triethyl decyl silicate and so forth are also useful. Where $m$ in the above formula has a value of 1, the formula represents di-ortho-silicates (disiloxanes). Presently useful disilicates include for example, hexaethyl disilicate, hexapropyl disilicate, tetraethyl dipropyl disilicate, hexa-n-amyl disilicate hexa-dodecylsilicate, hexa(1-ethylhexyl) disilicate, pentaethyl n-decyl disilicate, tetraethyl di-n-decyl disilicate, and so forth.

The proportions in which the alkyl silicate will be reacted with the fluorinated alcohol in conducting the method of this invention will depend on the number of fluorinated carbon atoms in the selected fluorinated alcohol. The presently provided method is conducted to produce a reaction product comprising a silicate ester containing at least 12 fluorinated carbon atoms. Sufficient alcohol must be provided to supply 12 fluorinated carbon atoms to the silicate. If the selected fluorinated alcohol itself contains at least 12 fluorinated carbon atoms, transesterification of equimolar proportions of the selected silicate and the fluorinated alcohol will be effective to produce a fluoroalkyl silicate containing at least 12 fluorinated carbon atoms. On the other hand, where the selected alcohol is one containing only two fluorinated carbon atoms, like $HCF_2CF_2CH_2OH$, it will be necessary to produce substitution of at least six fluoroalkyl radicals for the original alkyl radicals of a disilicate to produce a silicate ester containing at least 12 fluorinated carbon atoms. Accordingly, at least six moles of the fluorinated alcohol will be consumed per mole of alkyl silicate in this case, to effect complete transesterification.

The present method is not, however, limited to proportions of alcohol and silicate just sufficient to supply 12 fluorinated carbon atoms to the silicate by transesterification. On the one hand, it is not necessary that all the silicates present be converted to a silicate ester containing at least 12 fluorinated carbon atoms. Partial conversion is sufficient. On the other hand, the present method gives a complex reaction product. For example, the reaction product may contain each of the possible transesterification products. It also may contain other, unidentified reaction products. Therefore fluorinated alcohol may and generally will be consumed in reaction to supply 12 fluorinated carbon atoms to the silicate. Accordingly, the proportions of fluorinated alcohol to alkyl silicate used may vary widely, from sufficient to provide 12 fluorinated carbon atoms to only about 50% or even less of the silicate upon transesterification, up to an amount exceeding that required to replace every alkyl group of the silicate. In the preferred embodiment of this invention, the present method will be conducted by contacting the alkyl silicate ester with a number of moles of fluorinated alcohol equal to the number of alkyl groups present in the silicate. Thus, the preferred proportions will be about four moles of fluorinated alcohol per mole of a tetraalkyl silicate, and about six moles of the alcohol per mole of a hexaalkyl disilicate.

The mixture of the alkyl silicate and fluorinated alcohol used to conduct the present method may consist essentially of the stated reactants, or may comprise additional components. If an alcohol other than the fluorinated alcohol is present, it can also transesterify with the silicate ester. This invention includes introducing such an alcohol, comprising an alkanol, a glycol or the like, into the reaction mixture, whereby to form products of transesterification of the silicate with both a fluorinated alcohol as defined hereinabove and the stated additionally introduced alcohol. As has been stated hereinabove, the silicate ester to be formed by reaction of the hydrolyzable silicon compound and the fluorinated alcohol will be one in which each silicon atom is esterified by at least 3 ester radicals selected from the class consisting of saturated aliphatic hydrocarbon radicals and fluorine-substituted saturated aliphatic hydrocarbon radicals, and any residual silicon atom valence is connected to an oxygen-terminated silicon-to-silicon linking radical. Any alcohol other than the fluorinated alcohol which is introduced will be such as to produce a silicate ester of the stated nature. Where this alcohol is monohydric, it will be an alkylcarbinol, the alkyl radical of which is a saturated aliphatic carbon chain substituted only by substituents selected from the group consisting of H and F, and containing up to 18 carbon atoms. Exemplary thereof are ethyl alcohol, 2-trifluoromethyl-n-propyl alcohol, tert-butyl alcohol, 3-methyl-3-(trifluoromethyl)-butyl alcohol, 2,4-bis(trifluoromethyl)amyl alcohol, 2-ethylhexyl alcohol, n-nonyl alcohol, isotridecyl alcohol, sec-tetradecyl alcohol, perfluoroethyl hexyl carbinol, octadecyl alcohol, and so forth.

The above-mentioned oxygen-terminated silicon-to-silicon linking radical may be an oxygen atom, as present in a di-ortho-silicate. Alternatively, it may be provided by including a polyhydric alcohol in the reaction mixture comprising the fluorinated alcohol and alkyl silicate. Presently useful polyhydric alcohols are glycols wherein the divalent radical to which the alcoholic hydroxy radicals are attached is free of aliphatic unsaturation and consists of a chain of atoms selected from carbon and oxygen in which the substituents of said carbon atoms are selected from the group consisting of hydrogen and halogen atoms. Aliphatic glycols illustrative thereof include alkylene glycols such as ethylene glycol, propylene glycol, butylene gycol and the like; halogenated alkylene glycols such as 2,2,3,3-tetrafluorobutylene glycol, 2,2,5,5-tetrafluorohexylene glycol and the like; and poly(oxyalkylene)glycols such as diethylene glycol, triethylene glycol, a polyethylene glycol having a molecular weight of say, 200–2000; dipropylene glycol, polypropylene glycol, and so forth. Aromatic glycols illustrative of presently useful glycols include, for example, resorcinol, 2,2-bis(4-hydroxyphenyl)propane, 2,2′-dihydroxybiphenyl, hexachlorodihydroxybiphenyl, hexafluorodihydroxybiphenyl and so forth.

The reaction mixture comprising the fluorinated alcohol and an alkyl silicate may and preferably will also contain a base as a catalyst of the reaction therebetween. Any of a wide variety of bases may be used as a catalyst in this connection, including inorganic bases such as sodium hydroxide, lead oxide, or the like, and bases containing an organic radical such as the alkoxides of sodium, aluminum, magnesium, and so forth. Illustrative of such catalysts are sodium methoxide, sodium ethoxide, and so forth.

If desired, the reaction mixture including the fluorinated alcohol and alkyl silicate may also comprise an inert solvent or diluent such as carbon tetrachloride, chloroform, ethylene dichloride or like halogen compounds; acetonitrile, dimethylformamide or like nitrogen compounds; ethyl ether, isopropyl ether, dioxane or like oxygen compounds; and toluene, hexane or like hydrocarbons.

The temperature at which the reaction is conducted may be any temperature between room temperature and the decomposition temperature of the reaction mixture components. Preferably it is at least about 100° C. Conveniently the reaction may be carried out at the reflux temperature of the mixture. In the reaction, alcohols will be formed by displacement of the alkoxy radicals present on the alkyl silicate. Where the said alcohols are low boiling, it will generally be convenient to conduct the reaction at a temperature at which they are boiled off from the reaction mixture.

The fluorinated alcohol will be reacted with the alkyl silicate in accordance with the present method to form a reaction product comprising a silicate ester containing at least 12 fluorinated carbon atoms as hereinabove described. Preferably, the reactants will be maintained in contact under conditions conducive to transesterification as stated above, heated in the presence of a base as catalyst, until the resulting reaction product contains a substantial proportion, at least about 10%, and preferably above about 25% by weight, of silicate ester corresponding to the above-stated description. In the preferred embodiment of this invention, the alkyl silicate and fluorinated alcohol are heated in the presence of a base until a reaction mixture of complex composition, apparently comprising each of the possible transesterification products, has been formed, after which the heating is discontinued.

The above-stated procedure produces a crude reaction product which may and preferably will be processed as further described hereinafter.

While the foregoing description sets forth the preferred method of producing such a crude reaction product, this invention is not limited thereto.

A first optional processing step to be applied to the crude reaction product consists in treating it to remove impurities and like undesired contaminants therefrom. In particular, impurities of strongly basic character are desirably removed. Such impurities may consist, for example, of a basic catalyst added to the initial reaction mixture. Removal of such impurities can be effected by treating the crude reaction product with an absorbent. Any of a wide variety of absorbent materials may be used for this purpose. Thus for example, the absorbent may consist of silica gel, alumina, charcoal, an absorbent clay such as fuller's earth, or the like. Treatment therewith consists merely in bringing the crude product to be purified into intimate contact with the absorbent, in an amount sufficient to remove the quantity of impurities present in the product. The stated step of treating the reaction product with an absorbent to purify it may be conducted at any point in the working up of the reaction product; conveniently it may follow immediately after the formation of the reaction product.

A second step involved in processing the crude reaction product of the presently provided novel method will consist in separating the product from any volatile products present which have a boiling point below 600° F. corrected to atmospheric pressure. The removal of said volatile products frequently improves the properties of the reaction product, not only in that it prevents the product from exhibiting a high weight loss on heating, but also because it improves various other properties of importance for the presently contemplated application of these fluids, as hydraulic fluids, lubricant base fluids and so forth. Generally, the simplest technique for effecting separation of the desired portion of the crude reaction product, boiling above 600° F., will consist of distilling off the undesired volatile product component of the reaction mixture, and recovering the residue as the desired product. If desired, alternative means known to those skilled in the art for removal of undesired reaction product components, such as solvent extraction, may be used.

A third processing step will sometimes advantageously be included in the processing of the presently provided products, consisting of removing high melting material from the product. In a number of applications for the present novel product, a low freezing point is desired. Many embodiments of the method of this invention produce a fluid product having a very low freezing point. Where the freezing point is unduly high, it will generally be advantageous to lower it by removing high melting materials from the product of the present invention. Procedures for effecting this are well known in the art. For example, "dewaxing," consisting of dissolving a complex composition in a solvent, chilling it, and separating the crystals which form, is a well known procedure adapted for use in the present connection to remove high-melting constituents from a complex product as provided by this invention. Thus, the reaction product may be dissolved in a solvent such as a halogenated hydrocarbon like carbon tetrachloride. The solution may be chilled to a temperature as low as −65° F. to cause materials melting at or above this temperature to crystallize out. Filtering or decanting to separate the crystals isolates a fluid portion comprising the desired low-melting fluid. Generally, solvent will be economized by performing the stated "dewaxing" step after the distillation step described above, so as to minimize the amount of product to be treated, but the step may be performed at any desired point after formation of the crude reaction product.

The product of this invention produced as above stated will be a generally fluid, fire-resistant material which as such is often adapted for use in various applications. Sometimes it will advantageously be mixed with other substances to form compositions more specifically adapted for the intended use. Thus various additives may sometimes be admixed with the stated product to improve its properties for use as a hydraulic fluid or as a lubricating fluid. Such additives may comprise, for example, oiliness agents such as oil-soluble phosphate esters; viscosity index improvers such as methacrylates, polyisobutylenes, alkylated polystyrenes; corrosion inhibitors such as organic amines; antioxidants such as benzylaminophenol and phenothiazine; and the like.

Thickeners will be added to the present product to provide lubricating compositions of the consistency of a grease. Useful thickeners which may be used to advantage when the present product is used for high temperature applications are, for example, graphite, silica gel, and so forth. Such compositions will comprise a lubricating base fluid consisting of the novel product of this invention, and a thickener; additionally, they may include additives of the nature discussed in the previous paragraph, as property improvers.

The invention is illustrated but not limited by the following examples.

*Example I*

This example illustrates preparation and evaluation of an illustrative fluid as provided by this invention.

A mixture of 852.8 grams (g.) (4.1 moles) of tetraethyl silicate, 5457 g. (16.4 moles) of 1,1,7-trihydroperfluoroheptyl alcohol and 12.6 g. of sodium methoxide is heated over a 27-hour period to a final temperature of 226° C. The fluid crude reaction product is stirred with fuller's earth at 150° C. for ½ hour, and then separated by filtration. The filtrate is heated to remove volatile material at 0.8 mm. to a temperature of 200° C. The residue is a fluid product weighing 3772 g.

The fluid residue produced as stated above has the following properties:

Evaporation rate:
    6½ hours at 400° F.: weight loss 50.04%, 58.7%
    24 hours at 400° F.: weight loss 83.5%.
Pour point (below −95° F.):
    (ASTM Standard Method of Test for Cloud and Pour Points: D–97.)
Flash and fire points (above 750° F.):
    (ASTM Standard Method of Test for Flash and Fire Points by means of Cleveland Open Cup: D–92.)
Viscosity:
    100° F., 28.9 cs.
    210° F., 4.55 cs.
    Viscosity index—62.
    (ASTM Tentative Method of Test for Kinematic Viscosity: D–445.)
Specific gravity (1.774):
    (ASTM Standard Method of Test for Density and Specific Gravity: D–941.)
Refractive index: 1.3255
Oxidation corrosion:
    (MIL–L–9236 Test Method; 500° F., 48 hours, at 5 liters of air per hour.)
Weight loss of metals (mg. per sq. cm.):
    Titanium —0.05
    Aluminum —0.05
    Copper —0.26
    Silver —0.10
    Steel —0.04
Percent loss due to breakdown: 33.4%
Appearance: clear.
Viscosity change: (100° F.) 14.2%
Neutralization number change: +7.5

*Example II*

This example illustrates another preparation of a fluid product in accordance with this invention from a perfluoroheptyl alcohol.

A mixture of 156 g. (0.75 mole) of tetraethyl silicate, 996 g. (3 moles) of 1,1,7-trihydroperfluoroheptyl alcohol and 2.2 g. of sodium methoxide is heated to a final pot temperature of 230° C. over a 4-hour period, during which time 3 moles of ethanol are evolved and collected. The reaction product is stirred with 50 g. of fuller's earth. The filtrate separated from the fuller's earth is a fluid weighing 904 g.

This fluid product is now distilled under reduced pressure. The distillation is continued after removal of the portion boiling below a temperature equivalent to 600° F. corrected to atmospheric pressure, and separate fractions of the complex product boiling at different temperatures are recovered as follows:

| Cut | Pot Temp. (° C.) | Overhead Temp. (°C.) | Pressure (mm.) |
|---|---|---|---|
| First Drop | 65 | 45 | 0.9 |
| 74.3 g. #1 | 72 | 47 | 0.9 |
| 66.3 g. #2 | 98 | 52 | 0.8 |
| 24.0 g. #3 | 175 | 77 | 0.8 |
| 5.0 g. #4 | 183 | 140 | 0.6 |
| 22.2 g. #5 | 194 | 158 | 0.6 |
| 83.0 g. #6 | 194 | 163 | 0.6 |
| 126.2 g. #7 | 205 | 173 | 0.6 |
| 64.7 g. #8 | 211 | 183 | 0.75 |
| 67.2 g. #9 | 214 | 183 | 0.60 |
| 87.2 g. #10 | 222 | 186 | 0.60 |
| 66.5 g. #11 | 235 | 192 | 0.65 |
| 52.8 g. #12 | 246 | 196 | 0.60 |
| 25.0 g. #13 | 252 | 200 | 0.55 |
| 34.0 g. #14 | 270 | 220 | 0.55 |
| 43.0 g. #15 | 315 | 226 | 0.50 |

*Example III*

This example illustrates another preparation of a fluid in accordance with this invention from a perfluoroheptyl alcohol.

A mixture of 156 g. (0.75 mole) of tetraethyl silicate, 996 g. (3.0 moles) of 1,1,7-trihydroperfluoroheptyl alcohol and 2.2 g. sodium methoxide (0.2% by weight of the batch) is heated to 240° C. over 4 hours, during which time 138.6 g. of ethanol are evolved from the reaction mixture. The reaction product is treated with 50 g. of fuller's earth at 150° C. After separation from the fuller's earth, it is stripped of volatiles by heating it to a temperature of 180° C.–200° C. at 0.2 mm. The residue is a fluid having substantially the properties set forth in Example I.

Example IV

This example presents performance properties, including lubricating properties, of a fluid product prepared by reaction of tetraethyl silicate and 1,1,7-trihydroperfluoroheptyl alcohol in the presence of sodium methoxide, followed by purification with an absorbent and removal of volatiles, as described in Examples I–III.

| Characteristic: | Fluid product |
|---|---|
| Anticipated range, °F. | −65 to 650 |
| Pour point, °F. | −100 |
| Viscosity, cs. at | |
| −65° F. | <100,000 |
| 100° F. | 30–40 |
| 210° F. | 5–7 |
| Vis.-temp. coefficient | 0.8 |
| Flash point, °F. | >760 |
| Shell 4 Ball Wear Test 40 kg./1200 r.p.m., 75° C., 2 hrs. | 1.1 |
| Mean Hertz load (extreme pressure test) | 75 |
| Weld point | >316 |

PERFORMANCE PROPERTIES

THERMAL STABILITY TEST

[6 hours under nitrogen]

| | 500° F. | 650° F. |
|---|---|---|
| Loss due to decomposition, percent | 0.47 | 0.16 |
| Volatiles, percent | 0.1 | Nil |
| Final Viscosity at 100° F., cs | 28.11 | 26.79 |
| Change in Viscosity, percent | −6.7 | −11.0 |
| Final Neutralization No | 0.0 | 0.3 |
| Change in Neutralization No | 0.0 | +0.3 |

OXIDATION CORROSION TEST

[MIL–L–9236]

Run at 500° F. for 48 hours—5 liters of air/hour

Metal weight changes:

| | |
|---|---|
| Titanium | +0.02 mg./cm.² |
| Aluminum | +0.015 mg./cm.² |
| Copper | −0.05 mg./cm.² |
| Silver | −0.015 mg./cm.² |
| Steel (1020) | +0.015 mg./cm.² |
| Appearance of metals | OK—no pitting—no etching. |
| Appearance of fluid | Color changed from light yellow to dark amber. No sludge. |
| Final viscosity of fluid | 3.29 cs. |
| Percent change in viscosity | +10.8%. |
| Final neutralization No. | 7.5. |
| Change in Neutralization No. | +7.5. |

Example V

This example illustrates lubricating performance properties of a product as provided by this invention.

A fluid is prepared by reaction of 4 moles of 1,1,7-trihydroperfluoroheptyl alcohol per mole of tetraethyl silicate in the presence of sodium methoxide as described in Examples I–III.

The stated fluid is placed in the gear box of a power tool. Normally, the lubricant used in this gear box must be fortified with extreme pressure additives to achieve satisfactory lubrication of the gears. In the use of the fluid here described, no additives are introduced into the fluid, so that the inherent properties of the fluid product are solely responsible for the lubrication.

Operation of the power tool under normal conditions of use is observed to be smoother than with the additive-fortified lubricant customarily used in this machine.

After operation of the tool using the stated fluid as lubricant for some time, the gear box is disassembled. The condition of the gears is excellent. There is no apparent change in the fluid either on visual examination or on determination of the physical properties of the fluid.

Example VI

This example illustrates the use of a different catalyst in reacting the silicon compound and perfluoroalkyl alcohol used in Examples I–III.

A mixture of 25 g. (0.12 mole) of tetraethyl silicate, 166 g. (0.5 mole) of 1,1,7-trihydroperfluoroheptyl alcohol and 0.1 g. of lead oxide is heated to 150°–200° C., for about 12 hours. An additional 0.1 g. of lead oxide is added to the reaction mixture during this time. After completion of the reaction, the resulting fluid reaction product is stirred with fuller's earth, and then separated by filtration. The resulting fluid is substantially similar in composition to that obtained by the procedures described in Examples I–III.

Example VII

This example illustrates the use of a lower perfluoroalkyl alcohol in preparing a reaction product as provided by this invention.

A mixture of 42 g. (0.2 mole) of tetraethyl silicate, 185 g. (0.8 mole) of 1,1,7-trihydroperfluoroamyl alcohol and 0.5 g. of sodium methoxide is heated gradually over a 17-hour period to a final temperature of 293° C., during which time 150 cc. of distillate are evolved. The material is cooled to 150° C., stirred with 5 g. of fuller's earth and filtered. The filtrate is a heat-stable fluid product.

Example VIII

This example illustrates use of a mixture of lower molecular weight perfluoroalkyl alcohols in preparing the present prouct.

A reaction mixture comprising 150 g. of an equimolar mixture of 1,1,3-trihydroperfluoropropyl alcohol and 1,1,5-trihydroperfluoroamyl alcohol, 42 g. of tetraethyl silicate and 0.2 g. of lead oxide is heated to 170° C. over 12 hours. Treatment of the reaction product with fuller's earth to remove the catalyst gives a viscous fluid of very low pour point.

Example IX

This example illustrates the use of a mixture of alcohols comprising a higher fluorinated alcohol in preparing the novel product of this invention.

A mixture of 41.6 g. (0.2 moles) of tetraethyl silicate, 132.8 g. (0.4 mole) of 1,1,7-trihydroperfluoroheptyl alcohol, 212.8 g. (0.4 mole) of 1,1,11-trihydroperfluoroundecyl alcohol and 0.8 g. of sodium methoxide is heated to a maximum pot temperature of 230° C. over a 4-hour period, during which time 0.8 mole (36 g.) of ethanol is evolved from the reaction mixture.

The filtrate is tripped to a temperature of 200° C. at 0.2 mm. providing a viscous fluid which is semi-solid at room temperature.

Eample X

This example illustrates the preparation of a product of this invention from a tetraalkyl silicate which is less subject to transesterification reactions than tetraethyl silicate.

A mixture of 498 g. of 1,1,7-trihydroperfluoroheptyl alcohol, 165 g. of tetra (2-ethylbutyl)silicate, and 1.3 g. of sodium methoxide is heated to reflux for 3 hours. Approximately 150 g. of 2-ethylbutyl alcohol is evolved from the reaction mixture. Removal of low-boiling material from the reaction product gives 245 g. of a viscous, red fluid boiling above 170° C. at 0.5 mm.

Example XI

This example illustrates preparation of a fluid product in accordance with the present invention from a disilicate.

A mixture of 85.6 g. (0.25 mole) of hexaethyl disilicate, 498 g. (1.5 moles) of 1,1,7-trihydroperfluoroheptyl alcohol and 1.2 g. of sodium methoxide is heated to a final pot temperature of 190° C. over a 4-hour period, during which 86 cc. (69 g.) of ethanol is evolved and collected. The reaction product is treated with fuller's earth and filtered, giving 453.8 g. of filtrate. The filtrate is stripped to 200° C., 0.2 mm., leaving a fluid product weighing 335 g. The fluid product has a viscosity of 31.7 cs. at 100° F., 4.78 cs. at 210° F. Its evaporation rate is 56.1%.

*Example XII*

This example illustrates use of a mixture of alcohols, one of which is fluorinated, in preparing a product according to this invention.

A mixture of 79.2 g. of 2-octanol and 62 g. of tetraethyl silicate with 1.2 g. of sodium methoxide is heated while ethanol is evolved. Then 149 g. of 1,1,7-trihydroperfluoroheptyl alcohol is added to the resulting reaction mixture, and heating to evolve ethanol is continued. The total reaction time is 4 hours, during which time about 90 g. of ethanol are recovered and the temperature is raised to 265° C. The reaction product is filtered with 10 g. of fuller's earth to remove sodium methoxide. A very viscous product is obtained after distillation through a molecular still.

*Example XIII*

This example illustrates preparation of a product as provided by this invention by reaction of a mixture of a fluorinated alcohol and a glycol with a silicon compound.

In this procedure, the glycol employed is a high molecular weight polyethylene glycol (sold under the name of Carbowax 20 M by Union Carbide Company, New York, New York).

To prepare the product, a mixture of 10 g. of the stated glycol, 132 g. of a mixture of 1,1,5-trihydroperfluoroamyl alcohol and 1,1,7-trihydroperfluoroheptyl alcohol, and 42 g. of tetraethyl silicate is heated in the presence of 0.4 g. of sodium methoxide to 180° C. over 4 hours while ethanol is removed.

Filtration of the reaction product through 5 g. of fuller's earth gives a dark fluid.

*Example XIV*

This example illustrates another preparation of a product as provided by this invention by reaction of a mixture of fluorinated alcohol and a glycol with a silicon compound.

In this procedure, the glycol employed is an aromatic glycol, which is a chlorinated 2,2'-dihydroxybiphenyl containing an average of 6 chlorine atoms per molecule.

A mixture of 104 g. of the stated glycol with 104 g. of tetraethyl silicate and 1.0 g. of lead oxide is first heated until the theoretical amount of ethanol has been recovered. Then 498 g. of 1,1,7-trihydroperfluoroheptyl alcohol is added to the reaction mixture, and heating is continued while ethanol is evolved. The reaction mixture is stripped to 200° C. at 0.2 mm. and then filtered with fuller's earth to produce a viscous fluid product.

What is claimed is:

1. The method of forming a heat-stable fluid which comprises reacting a hydrolyzable organic silicon compound of the formula:

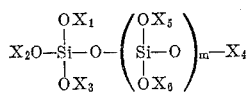

where $m$ is an integer of from 0 to 1 and each of $X_1$, $X_2$, $X_3$, $X_4$, $X_5$ and $X_6$ is a saturated hydrocarbon radical containing from 1 to 8 carbon atoms with a fluorinated alcohol of the formula:

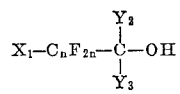

where $n$ is an integer from 2 to 12 and $Y_1$, $Y_2$ and $Y_3$ are each selected separately from the group consisting of H and F, in the presence of a basic catalyst selected from the group consisting of an alkoxide of the metals sodium, aluminum and magnesium containing from 1 to 2 carbon atoms, and lead oxide, the number of mols of fluorinated alcohol employed being substantially equal to the number of hydrocarbon groups present in said silicon compound, to form a reaction product comprising a mixture of silicon esters in which each silicon atom is esterified by at least 3 ester radicals selected from the group consisting of saturated hydrocarbon radicals and fluorine-containing saturated aliphatic hydrocarbon radicals and any residual valence is connected to an oxygen-terminated silicon to silicon linking radical, said reaction product containing a portion boiling above about 600° F. at atmospheric pressure, and recovering a fraction boiling above about 600° F.

2. The method of claim 1 in which said hydrolyzable silicon compound is tetraethyl silicate.

3. The method of claim 1 in which said hydrolyzable silicon compound is tetraethyl silicate and said fluorinated alcohol is 1,1,7-trihydroperfluoroheptyl alcohol.

4. The method of claim 1 in which said alkyl orthosilicate ester is reacted with a mixture of at least two fluorinated alcohols of the formula

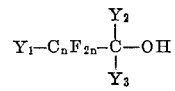

where $n$ is an integer of from 2 to 12 and $Y_1$, $Y_2$ and $Y_3$ are each selected separately from the group consisting of H and F.

5. The method of claim 4 in which said alkyl orthosilicate ester is tetraethyl silicate and said mixture of fluorinated alcohols is a mixture of 1,1,3-trihydroperfluoropropyl alcohol and 1,1,5-trihydroperfluoroamyl alcohol.

6. The method of claim 1 in which said alkyl orthosilicate ester is hexaethyl disilicate.

7. The method of claim 1 wherein said reaction product is contacted with an adsorbent.

8. The method of claim 7 wherein said adsorbent comprises fuller's earth.

9. The method of forming a heat-stable fluid which comprises reacting a hydrolyzable organic silicon compound of the formula:

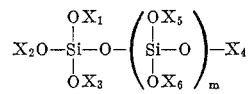

where $m$ is an integer of from 0 to 1 and each of $X_1$, $X_2$, $X_3$, $X_4$, $X_5$ and $X_6$ is a saturated hydrocarbon radical containing from 1 to 8 carbon atoms with a mixture of a fluorinated alcohol of the formula:

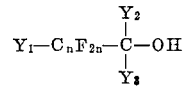

where $n$ is an integer from 2 to 12 and $Y_1$, $Y_2$, and $Y_3$ are each selected separately from the group consisting of H and F, and an alkylcarbinol, the alkyl radical of which is a saturated aliphatic carbon chain substituted only by substituents selected from the group consisting of H and F, and containing up to 18 carbon atoms, in the presence of a basic catalyst selected from a group consisting of an alkoxide of the metals sodium, aluminum and magnesium containing from 1 to 2 carbon atoms, and lead oxide, the total number of mols of fluorinated alcohol and alkylcarbinol employed being substantially equal to the number of hydrocarbon groups present in said silicon compound, to form a reaction product comprising a mixture of silicon esters in which each silicon atom is esterified by at least 3 ester radicals selected from the group consisting of saturated hydrocarbon radicals and fluorine-containing saturated aliphatic hydrocarbon radicals and any residual valence is connected to an oxygen-terminated silicon to silicon linking radical, said reaction product containing a portion boiling above about 600° F. at atmospheric pressure, and recovering a fraction boiling above about 600° F.

10. The method of forming a heat-stable fluid which comprises reacting a hydrolyzable silicon compound of the formula:

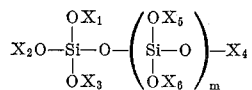

where $m$ is an integer of from 0 to 1 and each of $X_1$, $X_2$, $X_3$, $X_4$, $X_5$ and $X_6$ is a saturated hydrocarbon radical containing from 1 to 8 carbon atoms with a mixture of a fluorinated alcohol of the formula:

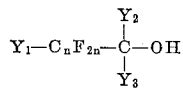

where $n$ is an integer from 2 to 12 and $Y_1$, $Y_2$ and $Y_3$ are each selected separately from the group consisting of H and F, and a glycol wherein the divalent radical to which the alcoholic hydroxy radicals are attached is free of aliphatic unsaturation and consists of a chain of atoms selected from carbon and oxygen in which the substitutents of said carbon atoms are selected from the group consisting of hydrogen and halogen atoms, in the presence of a basic catalyst selected from the group consisting of an alkoxide of the metals sodium, aluminum and magnesium containing from 1 to 2 carbon atoms, and lead oxide, the total number of mols of fluorinated alcohol and glycol employed being substantially equal to the number of hydrocarbon groups present in said silicon compound, to form a reaction product comprising a mixture of silicon esters in which each silicon atom is esterified by at least 3 ester radicals selected from the group consisting of saturated hydrocarbon radicals and fluorine-containing saturated aliphatic hydrocarbon radicals and any residual valence is connected to an oxygen-terminated silicon to silicon linking radical, said reaction product containing a portion boiling above about 600° F. at atmospheric pressure, and recovering a fraction boiling above about 600° F.

11. The method of claim 10 in which said hydrolyzable silicon compound is tetraethyl silicate, said fluorinated alcohol is 1,1,7-trihydroperfluoroheptyl alcohol and said glycol is hexachloro-2,2'-dihydroxybiphenyl.

12. The method of claim 10 in which said glycol is a polyethylene glycol.

References Cited by the Examiner
UNITED STATES PATENTS 2,777,870  1/1957  McBee et al. _____ 260—448.8
2,928,857  3/1960  Holt et al. _____ 252—78 XR JULIUS GREENWALD, *Primary Examiner.*

JOSEPH R. LIBERMAN, *Examiner.*